United States Patent [19]

Rosenbluth et al.

[11] Patent Number: 5,710,507

[45] Date of Patent: Jan. 20, 1998

[54] TEMPERATURE-CONTROLLED BATTERY RESERVE SYSTEM AND METHOD OF OPERATION THEREOF

[75] Inventors: David B. Rosenbluth, Richardson; Apurba Roy, Rockwall; Gabriel G. Suranyi, Plano, all of Tex.

[73] Assignee: Lucent Technologies Inc., Murray Hill, N.J.

[21] Appl. No.: 638,023

[22] Filed: Apr. 26, 1996

[51] Int. Cl.⁶ .................. H02J 7/00; H05B 3/60
[52] U.S. Cl. .................. 320/35; 219/209
[58] Field of Search ........... 320/35; 219/201, 219/209; 429/62, 120

[56] References Cited

U.S. PATENT DOCUMENTS

| | | | |
|---|---|---|---|
| 3,260,063 | 7/1966 | Johnson | 62/126 |
| 4,025,861 | 5/1977 | Godard et al. | 320/23 |
| 4,229,687 | 10/1980 | Newman | 320/35 X |
| 4,667,140 | 5/1987 | Sweetman | 320/35 X |
| 4,709,202 | 11/1987 | Koenck et al. | 320/43 |
| 4,727,306 | 2/1988 | Misak et al. | 320/35 |
| 4,926,106 | 5/1990 | Tanis | 320/35 |
| 5,055,656 | 10/1991 | Farah et al. | 219/209 |
| 5,281,792 | 1/1994 | Lee et al. | 219/209 |
| 5,362,942 | 11/1994 | Vanderslice, Jr. et al. | 219/209 |

*Primary Examiner*—Peter S. Wong
*Assistant Examiner*—Patrick B. Law

[57] ABSTRACT

For use in a battery reserve system having a reserve battery, a charging circuit coupled between a source of electrical power and the reserve battery for charging the reserve battery and a heating element in thermal communication with the reserve battery for increasing a temperature of the battery, a mode selection circuit and method of operation thereof. The mode selection circuit includes: (1) a temperature transducer, coupled to the reserve battery, for sensing the temperature of the reserve battery and (2) a mode-changing circuit, coupled to the temperature transducer, for selecting an alternative one of: (a) a heating mode wherein the source of electrical power is coupled to the heating element when the temperature of the reserve battery is less than a reference temperature thereby to heat the reserve battery and (b) a charging mode wherein the source of electrical power is coupled to the reserve battery when the temperature is greater than the reference temperature thereby to charge the reserve battery.

21 Claims, 2 Drawing Sheets

TEMPERATURE-CONTROLLED BATTERY RESERVE SYSTEM AND METHOD OF OPERATION THEREOF

TECHNICAL FIELD OF THE INVENTION

The present invention is directed, in general, to power supplies and, more specifically, to a temperature-controlled battery reserve system and a method of operation thereof.

BACKGROUND OF THE INVENTION

Battery reserve systems for powering systems, such as wireless telecommunications equipment, in the event of the loss of primary power are well known in the art. For instance, if commercially provided power derived from the local utility fails, a battery reserve unit is employed to maintain uninterrupted power service. To maintain a state of readiness, the battery reserve unit must be preserved in a fully-charged and operational condition at all times.

Prior art battery reserve systems generally include a backup battery coupled to a continuous battery charger and battery heater. The battery charger senses the battery voltage and preserves the charge of the battery at an optimal level without overcharging. During an AC power failure, the battery is then available to provide power in reserve. When the primary power is restored, the battery charger restores the battery to a full charge.

A characteristic of batteries is that the accessible capacity declines dramatically at low temperatures. Simply stated, if the battery is too cold, the battery capacity is reduced, even if the battery is fully charged. Therefore, in addition to maintaining a wholly charged battery, it is necessary to heat the battery to a high enough temperature to maintain the battery capacity readiness.

Conventionally, a battery heater includes a resistive heating element in close proximity to the battery. The heating element may be controlled in a closed loop temperature control system. If the temperature of the battery falls below some minimum lower level (e.g., 0° Celsius), the battery heating element is enabled. Conversely, when the temperature of the battery is above the minimum level, the battery heating element is disabled. Therefore, regardless of the environment of the battery reserve system, the temperature of the battery is maintained at an acceptable level to preserve the efficiency of the battery.

U.S. Pat. No. 4,025,861, issued to Godard, et al. on May 24, 1977, and entitled "Method and Device for Charging and Heating at Low Temperature a Sealed Storage Cell Battery," discloses a temperature-sensitive battery reserve system. More specifically, Godard, et al. discloses a method and device for charging a sealed storage cell battery according to which the battery is heated when its temperature is below a determined value. The intensity of a charge current, under such circumstances, is lowered by being shunted to heat the battery when the voltage of the battery reaches a given value. In short, the value of the voltage of the battery supplies the signal that facilitates the heating of the battery.

While Godard, et al. teaches a temperature sensitive battery reserve system, it suffers from the following deficiencies. First, heater activation is driven by a voltage across the battery and the battery heating is actually fed from the battery itself. At first glance this appears to be meritorious; however, the heater continues to operate even if commercial power fails, thereby reducing the capacity of the battery when its capacity is most needed. Second, operation of the heater from the battery requires a large current carrying and expensive switching element therebetween. Additionally, the switching element is permitted to operate within its linear region thereby dissipating substantial energy. Finally, the battery may be charged at low temperatures (e.g., 5° Celsius). Charging the battery at low temperatures requires a higher voltage input level to a linear charger thereby causing the charger to be inefficient under higher temperature conditions. In conjunction therewith, low temperature charging degrades the longevity of the battery.

Accordingly, what is needed in the art is a more efficient and reliable battery reserve system that monitors a temperature and controls a heating and charging function of the battery within a proper operating condition therefor.

SUMMARY OF THE INVENTION

To address the above-discussed deficiencies of the prior art, for use in a battery reserve system having a reserve battery, a charging circuit coupled between a source of electrical power and the reserve battery for charging the reserve battery and a heating element in thermal communication with the reserve battery for increasing a temperature of the battery, a mode selection circuit and method of operation thereof.

The mode selection circuit includes: (1) a temperature transducer, coupled to the reserve battery, for sensing the temperature of the reserve battery and (2) a mode-changing circuit, coupled to the temperature transducer, for selecting an alternative one of: (a) a heating mode wherein the source of electrical power is coupled to the heating element when the temperature of the reserve battery is less than a reference temperature thereby to heat the reserve battery and (b) a charging mode wherein the source of electrical power is coupled to the reserve battery when the temperature is greater than the reference temperature thereby to charge the reserve battery.

The mode selection circuit alternatively selects a mutually-exclusive one of the heating or charging mode for the battery reserve system. The source of electrical power, therefore, energizes the heating mode separately from the charging mode; as a result, the source of electrical power may be selected to handle either the heating or charging mode, independently, but not both modes simultaneously. For instance, if 5 watts are necessary to charge the battery and an additional 5 watts are necessary to heat the battery, then typically the source of electrical power should provide 10 watts of power to the battery reserve system. However, the battery reserve system of the present invention only requires 5 watts of power from the source of electrical power because the independent nature of the heating and charging modes of operation.

In an alternative embodiment of the present invention, the battery reserve system includes a circuit for disabling the heating element if the source of electrical power is disabled. If the heating mode continues to operate even if the source of electrical power fails, the capacity of the battery will be drained to employ the heating element when the battery capacity is most needed. The disabling circuit, therefore, disables the heating element when the source of electrical power fails.

In an alternative embodiment of the present invention, the heating element is operated at a voltage exceeding a voltage of the reserve battery. There are advantages associated with operating the heating element at an elevated voltage, namely, a more economical switching device (coupled to the heating element) may be employed to control the heating element due to the reduced current draw across the switching device.

In an alternative embodiment of the present invention, the reference temperature is about 20° C. One of ordinary skill in the art should understand that any reference temperature is well within the broad scope of the present invention. Again, the charging mode is enabled only when the battery temperature exceeds the reference temperature. As a result of this operation, the charging mode is more efficient and the life expectancy of the battery is extended. More specifically, since the charging mode is disabled at low temperatures, the battery reserve system does not have to generate a high battery voltage level associated with low temperature operation.

In an alternative embodiment of the present invention, the charging circuit is a current-limited adjustable linear regulator. Those of ordinary skill in the art should understand the advantages associated with regulator devices; also, other charging circuits and devices are well within the broad scope of the present invention.

In an alternative embodiment of the present invention, the reserve battery is coupled to a boost converter, the boost converter having an output of about 30 volts. One of ordinary skill in the art should understand that any voltage at the output of the boost converter is well within the broad scope of the present invention. Moreover, other power supply topologies coupled to the reserve battery are also within the broad scope of the present invention.

In an alternative embodiment of the present invention, the source of electrical power is a DC source provided from a power supply including a series-coupled rectifier and transformer. The power supply includes, without limitation, a switched-mode power supply such as flyback or forward power converter topology.

Another aspect of the present invention is a battery back-up power supply, including: (1) a primary power supply and (2) a battery reserve system, including: (a) a reserve battery, (b) a charging circuit coupled between a source of electrical power and the reserve battery for charging the reserve battery, (c) a heating element in thermal communication with the reserve battery for increasing a temperature of the battery and (d) a mode selection circuit constructed according to the principles of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

The principles of the present invention are directed to a temperature-controlled, heated, battery reserve system. A battery reserve system incorporating the principles of the present invention is ideally suited for powering systems such as wireless telecommunications located on customer premises. The location of wireless telecommunications systems in a customer's home will require the efficient utilization of a battery reserve system to ensure the availability of telecommunications services during electrical utility power outages.

The efficient utilization of battery reserve systems for wireless telecommunications equipment in the home will require careful consideration of the size, weight, performance, and in particular, the longevity of the battery. Additionally, suitable battery performance will be demanded in harsh environments where ambient temperatures may often be below 0° C., and in some extreme outdoor environments as low as −40° C. A principle of the present invention is directed to ensuring the longevity of conventional batteries in these harsh environments. It is also anticipated that the principles of the present invention would be applicable to other related fields such as, without limitation, the computer and automotive industry. For instance, the battery reserve system may be employed in battery operated electric vehicles.

Figure 1:
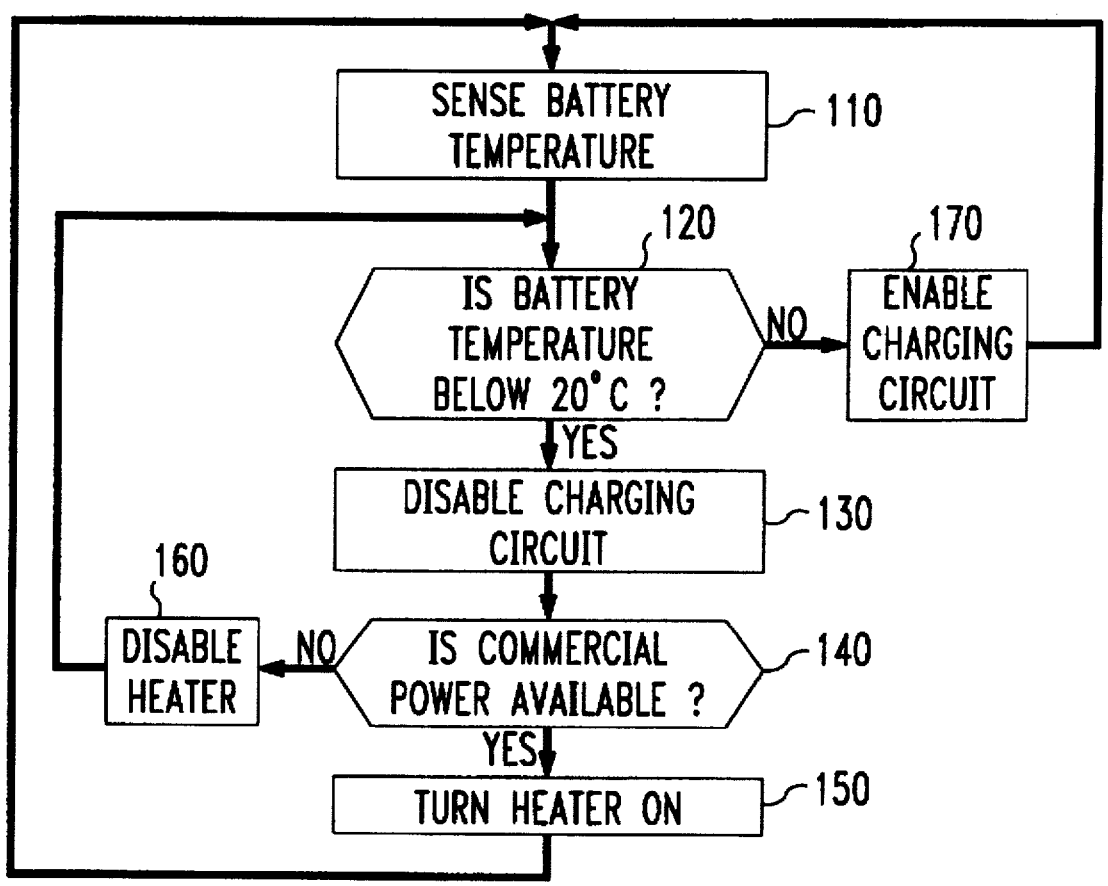
FIG. 1 illustrates one embodiment of a method of operation according to the principles of the present invention.

Referring now to FIG. 1, illustrated is one embodiment of a method of operation according to the principles of the present invention. In a sense battery temperature step 110, a battery temperature is sensed. In a temperature below 20° C. decisional step 120, it is determined whether the sensed battery temperature is below 20° C. The selection of a value of 20° C. is predicated on the recognition that the charging of lead-acid batteries below a temperature of 20° C. is deleterious to the longevity of optimal battery performance. Again, alternative embodiments of the present invention may include other battery structures necessitating the selection of a more preferred minimum threshold temperature below which the battery charging function of the present invention should be disabled.

If the sensed battery temperature is not below 20° C., the battery charging circuit is enabled in an enable charging step 170. If the sensed battery temperature is below 20° C., however, the battery charging circuit is disabled in a disable charging step 130. If the sensed battery temperature is below 20° C., it is desired to heat the battery to a temperature above 20° C. before enabling the charging circuit.

However, if commercial power is not available to the input of a system employing the battery reserve system of the present invention, the electrical power necessary to heat the battery must be drawn from the battery itself. This is not desirable, and thus, in a commercial power available decisional step 140, the availability of commercial power is sensed. If commercial power is not available, the battery heater is disabled in a disable heater step 160. If commercial power is available, however, the battery heater is enabled in an enable heater step 150. Thus, the battery heater is enabled only if both the battery temperature is below the 20° C. temperature threshold and the commercial power is available to provide energy for heating the battery. Furthermore, the battery charging circuit is always disabled if the battery temperature drops below the 20° C. temperature threshold, thereby preventing charging to the battery.

Figure 2:
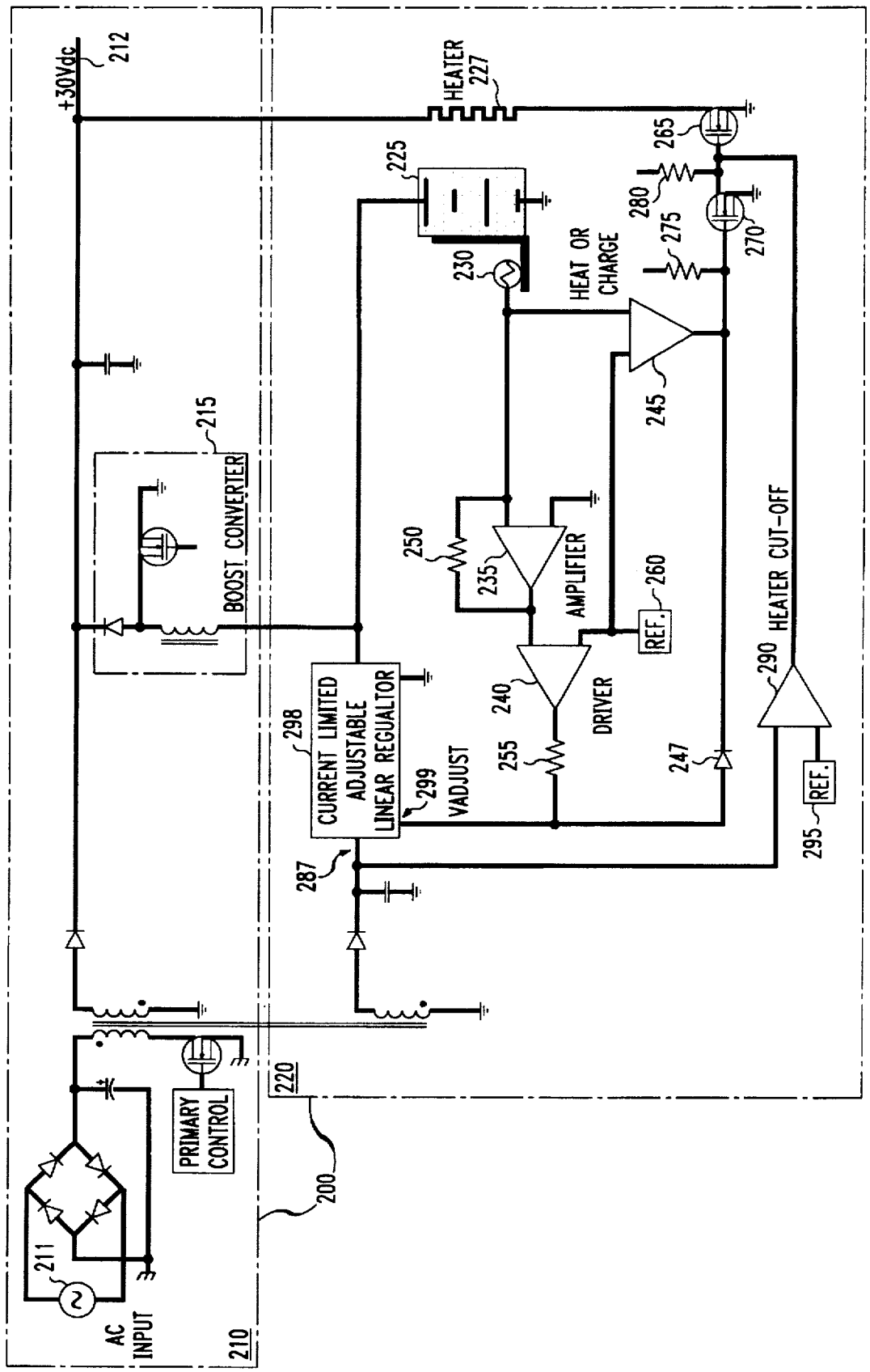
FIG. 2 illustrates one embodiment of a battery back-up power supply incorporating the principles of the present invention.

Turning now to FIG. 2, illustrated is one embodiment of a battery back-up power supply 200 incorporating the principles of the present invention. The battery back-up power supply 200 includes a primary power supply 210 and a battery reserve system 220. One of ordinary skill in the art should understand that other power supply topologies and alternative embodiments of the battery reserve system 220 are well within the broad scope of the present invention.

The primary power supply 210 employs a conventional flyback topology on the front-end. Those of ordinary skill in the art understand the operation and advantages associated with the flyback topology and, consequently, a detailed description of its operation is omitted. The primary power supply 210 also includes a conventional boost converter 215 that converts one DC voltage to a greater DC voltage at the output of the boost converter. Thus, the battery back-up power supply 200 provides a +30 volt DC output 212 from a reserve battery 225 having typical +12 volt DC nominal voltage when the commercial power at an AC input 211 is interrupted.

A temperature transducer 230 senses a temperature of the reserve battery 225, and a mode changing circuit (generally including a comparator 245 and reference 260) alters, in response thereto, the mode of operation of the battery reserve system 220. In a first mode of operation of the battery reserve system 220, the temperature transducer 230 senses the temperature of the reserve battery 225 and, if the temperature of the reserve battery 225 exceeds 20° C., the mode-changing circuit enables a charging mode wherein the reserve battery 225 is charged to a nominal +12 volts DC. In a second mode of operation of the battery reserve system 220, if the temperature of the reserve battery 225 sensed by the temperature transducer 230 is less than 20° C., the mode-changing circuit disables the charging mode. Moreover, if the commercial power is available, the mode-changing circuit enables a heating mode wherein a heating element, coupled to the commercial power, energizes to heat the reserve battery 225.

The temperature transducer 230 detects a temperature of the reserve battery 225 and produces a voltage proportional to the sensed temperature. The voltage produced by the temperature transducer 230 is coupled to an input of a differential amplifier 235. In the illustrated embodiment, the differential amplifier 235 is an operational amplifier having a voltage gain controlled by a feedback resistor 250. The output of the differential amplifier 235 is coupled to a first input of the differential amplifier 240 and a reference voltage 260 is coupled to a second input of the differential amplifier 240. The differential amplifier 240 operates as a voltage regulator whereby its output voltage controls a current-limited adjustable linear regulator 298 (e.g., a National Semiconductor LM3420, commercially available from National Semiconductor Corporation of Tucson, Ariz.). The regulator 298 disables the charging of the reserve battery 225 by the application of an appropriate voltage to an input 299. The voltage output of the differential amplifier 240 is coupled to the input 299 of the regulator 298 by a resistor 255. Thus, the temperature of the reserve battery 225 ultimately controls the voltage output of the differential amplifier 240 (coupled to the input 299 of the regulator 298) to thereby control the charging of the reserve battery 225.

The voltage produced by the temperature transducer 230 is further coupled to a first input of the differential amplifier 245; also, the reference voltage 260 is coupled to a second input of the differential amplifier 245. The differential amplifier 245 operates as a voltage comparator wherein its output voltage assumes a first voltage state if the voltage produced by the temperature transducer 230 is less than the reference voltage 260. The differential amplifier 245 assumes a second voltage state if the voltage produced by the temperature transducer 230 is greater than the reference voltage 260. Thus, in the illustrated embodiment, the reference voltage 260 is selected to induce the differential amplifier 245 to switch its output voltage state when the temperature of the reserve battery 225 sensed by the temperature transducer 230 is below 20° C. Again, the differential amplifier 245 and reference 260 act as the mode changing circuit; also, the mode changing circuit in combination with the temperature transducer 230 constitute a mode selection circuit constructed according to the principles of the present invention.

The voltage output of the differential amplifier 245 is coupled to the gate terminal of a field-effect transistor ("FET") 270. The gate terminal of the FET 270 is further coupled by a resistor 275 to a high voltage source such that when the output of the differential amplifier 245 is at a low voltage, the FET 270 is turned off. The voltage output of the differential amplifier 245 is also coupled through a diode 247 to the input 299 of the regulator 298. When the voltage of the differential amplifier 245 is in a low state, the diode 247 conducts thereby pulling down the input 299 of the regulator 298 and disabling the charging function of the regulator 298.

Conversely, when the output voltage of the differential amplifier 245 is at a high voltage, the FET 270 is turned on. The source terminal of the FET 270 is coupled to a high voltage source by a resistor 280 and further coupled to the gate terminal of a FET 265. When the FET 270 is on, the gate terminal of the FET 265 is pulled to a low voltage thereby turning off the FET 265. Conversely, when the FET 270 is off, the gate terminal of the FET 265 is pulled to a high voltage by the resistor 280 thereby turning on the FET 265. The source terminal of the FET 265 is coupled to a heating element 227. The heating element 227 is further coupled to the a voltage output 212 of the primary power supply 210. Thus, when the FET 265 turns on, a current flows through the heating element 227 thereby heating the reserve battery 225.

A differential amplifier 290 and voltage reference 295 provide a mechanism to disable the heating circuitry of the battery reserve system 220 when the commercial power is not available. When the commercial power is interrupted to an input 211, the primary power supply 210 is not able to provide a voltage to the an input 287 of the battery reserve system 220. The voltage available at the input 287 of the battery reserve system 220 is coupled to a first input of the differential amplifier 290; also, the reference voltage 295 is coupled to a second input of the differential amplifier 290. The output of the differential amplifier 290 is coupled to the gate terminal of the FET 265.

The differential amplifier 290 operates as a voltage comparator wherein its output voltage assumes a first voltage state if the voltage available at the input 287 to the battery reserve system 220 is less than the reference voltage 295. The differential amplifier 290 assumes a second voltage state if the voltage available at the input 287 to the battery reserve system 220 is greater than the reference voltage 295. Thus, in the illustrated embodiment, the reference voltage 295 is selected to cause the differential amplifier 290 to switch its output voltage state when the commercial power supplied to the input 211 of the primary power supply 210 is interrupted. Thus, if the output of the differential amplifier 290 is low, the FET 265 will be turned off thereby disabling the flow of current through the heating element 227.

Although the present invention has been described in detail, those skilled in the art should understand that they can make various changes, substitutions and alterations herein without departing from the spirit and scope of the invention in its broadest form.

What is claimed is:

1. For use in a battery reserve system having a reserve battery, a charging circuit coupled between a source of electrical power and said reserve battery for charging said reserve battery and a heating element in thermal communication with said reserve battery for increasing a temperature of said battery, a mode selection circuit, comprising:

a temperature transducer, coupled to said reserve battery, for sensing said temperature of said reserve battery; and a mode-changing circuit, coupled to said temperature transducer, for selecting an alternative one of:

a heating mode wherein said source of electrical power is coupled to said heating element when said temperature of said reserve battery is less than a reference temperature thereby to heat said reserve battery, and a charging mode wherein said source of electrical power is coupled to said reserve battery when said temperature is greater than said reference temperature thereby to charge said reserve battery.

2. The circuit as recited in claim 1 further comprising a circuit for disabling said heating element if said source of electrical power is disabled.

3. The circuit as recited in claim 1 wherein said heating element is operated at a voltage exceeding a voltage of said reserve battery.

4. The circuit as recited in claim 1 wherein said reference temperature is about 20° C.

5. The circuit as recited in claim 1 wherein said charging circuit is a current-limited adjustable linear regulator.

6. The circuit as recited in claim 1 wherein said reserve battery is coupled to a boost converter, said boost converter having an output of about 30 volts.

7. The circuit as recited in claim 1 wherein said source of electrical power is a DC source provided from a power supply comprising a series-coupled rectifier and transformer.

8. For use in a battery reserve system having a reserve battery, a charging circuit coupled between a source of electrical power and said reserve battery for charging said reserve battery and a heating element in thermal communication with said reserve battery for increasing a temperature of said battery, a method of selecting modes of said battery reserve system, comprising the steps of:

sensing said temperature of said reserve battery with a temperature transducer coupled to said reserve battery; and selecting an alternative one of:

a heating mode wherein said source of electrical power is coupled to said heating element when said temperature of said reserve battery is less than a reference temperature thereby to heat said reserve battery, and a charging mode wherein said source of electrical power is coupled to said reserve battery when said temperature is greater than said reference temperature thereby to charge said reserve battery.

9. The method as recited in claim 8 further comprising the step of disabling said heating element if said source of electrical power is disabled.

10. The method as recited in claim 8 further comprising the step of operating said heating element at a voltage exceeding a voltage of said reserve battery.

11. The method as recited in claim 8 wherein said reference temperature is about 20° C.

12. The method as recited in claim 8 wherein said charging circuit is a current-limited adjustable linear regulator.

13. The method as recited in claim 8 wherein said reserve battery is coupled to a boost converter, method comprising the step of providing a 30 volts output from said boost converter.

14. The method as recited in claim 8 further comprising the step of providing said source of electrical power from a power supply comprising a series-coupled rectifier and transformer.

15. A battery back-up power supply, comprising:

a primary power supply; and a battery reserve system, comprising:

a reserve battery;

a charging circuit coupled between a source of electrical power and said reserve battery for charging said reserve battery;

a heating element in thermal communication with said reserve battery for increasing a temperature of said battery; and a mode selection circuit, comprising:

a temperature transducer, coupled to said reserve battery, for sensing said temperature of said reserve battery; and a mode-changing circuit, coupled to said temperature transducer, for selecting an alternative one of:

a heating mode wherein said source of electrical power is coupled to said heating element when said temperature of said reserve battery is less than a reference temperature thereby to heat said reserve battery, and a charging mode wherein said source of electrical power is coupled to said reserve battery when said temperature is greater than said reference temperature thereby to charge said reserve battery.

16. The system as recited in claim 15 wherein said battery reserve system further comprises a circuit for disabling said heating element if said source of electrical power is disabled.

17. The system as recited in claim 15 wherein said heating element is operated at a voltage exceeding a voltage of said reserve battery.

18. The system as recited in claim 15 wherein said reference temperature is about 20° C.

19. The system as recited in claim 15 wherein said charging circuit is a current-limited adjustable linear regulator.

20. The system as recited in claim 15 wherein said primary power supply further comprises a boost converter, said boost converter having an output of about 30 volts.

21. The system as recited in claim 15 wherein said source of electrical power is a DC source provided from said primary power supply comprising a series-coupled rectifier and transformer.

* * * * *